(12) United States Patent
Wang et al.

(10) Patent No.: US 10,570,997 B2
(45) Date of Patent: Feb. 25, 2020

(54) FRICTION TYPE ONE-WAY HIGH DAMPING GAUGE TENSIONER

(71) Applicant: ALT AMERICA INC., Westland, MI (US)

(72) Inventors: Wenhuan Wang, Westland, MI (US); Hao Xu, Jiangsu Province (CN)

(73) Assignee: ALT AMERICA INC., Westland, MI (US)

( * ) Notice: Subject to any disclaimer, the term of this patent is extended or adjusted under 35 U.S.C. 154(b) by 297 days.

(21) Appl. No.: 15/496,041

(22) Filed: Apr. 25, 2017

(65) Prior Publication Data

US 2018/0306282 A1    Oct. 25, 2018

(51) Int. Cl.
*F16H 7/12* (2006.01)
*F16H 7/08* (2006.01)
*F01L 1/02* (2006.01)

(52) U.S. Cl.
CPC ......... *F16H 7/1218* (2013.01); *F16H 7/0831* (2013.01); *F01L 1/024* (2013.01); *F16H 2007/081* (2013.01); *F16H 2007/0844* (2013.01); *F16H 2007/0865* (2013.01); *F16H 2007/0893* (2013.01)

(58) Field of Classification Search
CPC ............... F16H 7/1218; F16H 7/0831; F16H 2007/081; F16H 2007/0844; F16H 2007/0865; F16H 2007/0893; F16H 7/1281; F16H 7/1236; F16D 41/206
See application file for complete search history.

(56) References Cited

U.S. PATENT DOCUMENTS

| | | | | |
|---|---|---|---|---|
| 6,450,907 B1* | 9/2002 | Serkh | ..................... | F16H 7/1236 474/117 |
| 7,285,065 B2* | 10/2007 | Dinca | ................... | F16H 7/1281 474/112 |
| 2006/0035740 A1* | 2/2006 | Lehtovaara | ........... | F16D 41/206 474/237 |
| 2006/0258497 A1* | 11/2006 | Dec | ........................ | F16H 7/1218 474/112 |
| 2012/0316018 A1* | 12/2012 | Ward | .................... | F16H 7/1218 474/135 |
| 2017/0037940 A1* | 2/2017 | Serkh | ..................... | F16H 7/1281 |
| 2018/0363742 A1* | 12/2018 | Dec | ........................ | F16H 7/1281 |

* cited by examiner

*Primary Examiner* — Michael R Mansen
*Assistant Examiner* — Robert T Reese
(74) *Attorney, Agent, or Firm* — Young Basile Hanlon & MacFarlane, P.C.

(57) ABSTRACT

A tensioner for reducing vibration and noise associated with a vehicle engine includes: a tensioner arm having a cylindrical protrusion extending from a first side of the tensioner arm; the cylindrical protrusion having at least one counterbore disposed on a surface of the cylindrical protrusion and an inner bore extending through the cylindrical protrusion; an axle adapted to be received by the inner bore, the tensioner arm being adapted to rotate about the axle; a spring disposed proximate a second side of the tensioner arm, opposite the first side, the spring being adapted to bias the tensioner arm in a first direction; and a damping structure that includes a gripping seat adapted to engage a portion of the tensioner arm, in which the damping structure limits rotation of the tensioner arm in a second direction opposite the first direction.

17 Claims, 11 Drawing Sheets

FRICTION TYPE ONE-WAY HIGH DAMPING GAUGE TENSIONER

TECHNICAL FIELD

This disclosure relates to friction type one-way damping gauge tensioners.

BACKGROUND

A vehicle engine, such as a gasoline and/or a diesel engine, can produce undesirable vibration and noise. The vibration and noise can be associated with an engine timing system of the vehicle engine. As customer expectations continue to increase, the need to reduce the vibration and noise perceived by the customer has become more important. Typically, vibration and noise perceived by the customer can be reduced by having an engine timing system that includes a timing belt tensioner (also known or referred to as a "timing tensioner" or a "gauge tensioner") that includes a damping structure.

Timing belt tensioners that include a damping structure typically have low damping characteristics and tend to only reduce a limited amount of the overall vibration and noise perceived by the customer. Further, typical timing belt tensioners do not reduce vibration quickly and do not effectively absorb energy generated by the vibration. In vehicle engines that have a relatively large amount of engine torsional vibration, these typical timing belt tensioners may be ineffective and can result in timing belt tooth skipping.

SUMMARY

Disclosed herein are implementations of friction type one-way damping gauge tensioners.

An aspect of this disclosure is an engine timing tensioner for reducing vibration and noise associated with a vehicle engine. The tensioner may include: a tensioner arm having a cylindrical protrusion extending from a first side of the tensioner arm; the cylindrical protrusion having at least one counter-bore disposed on a surface of the cylindrical protrusion and an inner bore extending through the cylindrical protrusion; an axle adapted to be received by the inner bore, the tensioner arm being adapted to rotate about the axle; a spring disposed proximate a second side of the tensioner arm, opposite the first side, the spring being adapted to bias the tensioner arm in a first direction; and a damping structure that includes a gripping seat adapted to engage a portion of the tensioner arm, wherein the damping structure limits rotation of the tensioner arm in a second direction opposite the first direction.

Another aspect of this disclosure is a tensioner that may include: a tensioner arm having a protrusion extending from the tensioner arm; the protrusion having an inner bore extending through the protrusion; an axle adapted to be received by the inner bore, the tensioner arm being adapted to rotate about the axle; a spring disposed on an inner portion of the tensioner arm, the spring being adapted to bias the tensioner arm in a first direction; and a damping structure that includes a gripping seat adapted to engage a portion of the tensioner arm, wherein the damping structure limits rotation of the tensioner arm in a second direction opposite the first direction.

Another aspect of this disclosure is a system that may include: a tensioner arm having a cylindrical protrusion extending from a first side of the tensioner arm; the cylindrical protrusion having at least one counter-bore disposed on a surface of the cylindrical protrusion and an inner bore extending through the cylindrical protrusion; an axle adapted to be received by the inner bore, the tensioner arm being adapted to rotate about the axle; a spring disposed proximate a second side of the tensioner arm, opposite the first side, the spring being adapted to bias the tensioner arm in a first direction; a friction pad that includes at least one boss having a profile corresponding to a profile of a at least one counter-bore; a fixed bottom plate that includes a first pin hole disposed on an outer surface of the fixed bottom plate; a damping structure that includes a gripping seat adapted to engage a portion of the tensioner arm, wherein the damping structure limits rotation of the tensioner arm in a second direction opposite the first direction; and a pin adapted to be received by a first pin hole and a second pin hole disposed on an outer surface of the tensioner arm when the first pin hole is aligned with the second pin hole.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A vehicle engine, such as a spark ignition internal combustion engine can include a gasoline, a diesel engine, a hybrid engine, or other suitable spark ignition internal combustion engine. The vehicle engine includes an engine timing system adapted to control ignition timing such that spark, which ignites fuel compressed by a piston in a combustion chamber, will occur in the combustion chamber near the end of a compression stroke of the piston in the combustion chamber. Controlling ignition timing can affect performance of the vehicle engine and can improve fuel efficiency of the vehicle engine. For example, excessive vibration and/or noise can occur when spark occurs too soon or too late relative to the compression stroke of the piston. Further, the vehicle engine can be damaged when ignition timing is improperly controlled. As customer expectations continue to increase, the need to reduce the vibration and noise perceived by the customer has become more important. Typically, vibration and noise perceived by the customer can be reduced by having an engine timing system that includes a timing belt tensioner that includes a damping structure.

Timing belt tensioners that include a damping structure typically have low damping characteristics and tend to only reduce a limited amount of the overall vibration and noise perceived by the customer. Further, typical timing belt tensioners do not reduce vibration quickly and do not effectively absorb energy generated by the vibration. In vehicle engines that have a relatively large amount of engine torsional vibration, these typical timing belt tensioners may be ineffective and can result in timing belt tooth skipping. Accordingly, a friction type one-way high damping gauge tensioner may be desirable.

In some embodiments, an engine timing system can include a friction type one-way high damping gauge tensioner according to the principles of the present disclosure. The friction type one-way high damping gauge tensioner can be adapted to allow a relatively large friction force to be generated when a tensioner arm associated with the engine timing system is rotated in a first direction and can allow a relatively small frictional force to be generated when the tensioner arm is rotated in a second direction opposite the first direction. The friction type one-way high damping gauge tensioner can be adapted to provide a friction brake which may effectively inhibit and/or reduce timing belt jitter, vibration, noise, or a combination thereof that can result from tensioner arm swing.

Figure 1:
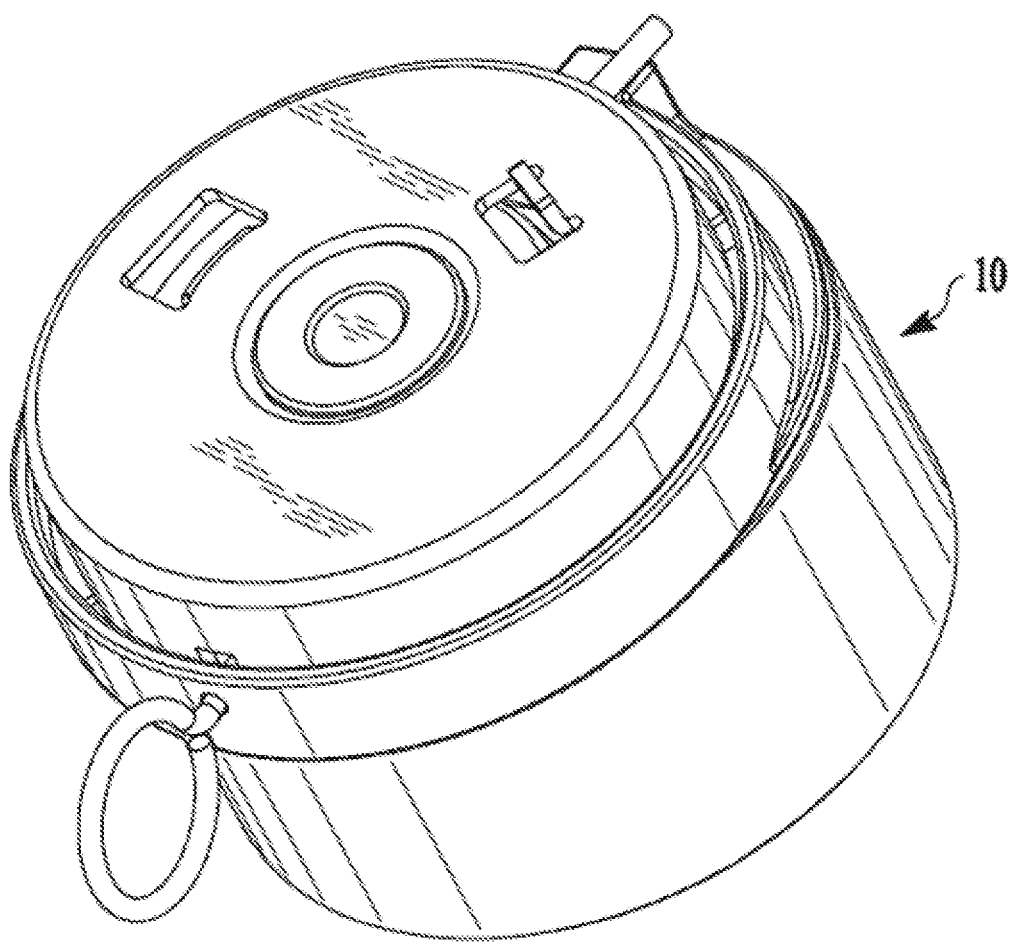
FIG. 1 generally illustrates an example friction type one-way high damping gauge tensioner according to the principles of the present disclosure.

FIG. 1 generally illustrates an example friction type one-way high damping gauge tensioner 10 ("tensioner 10") according to the principles of the present disclosure. The tensioner 10 can be associated with a vehicle engine, such as a spark ignition internal combustion engine, as described above. The tensioner 10 is adapted to control ignition timing of the vehicle engine. Additionally, or alternatively, the tensioner 10 is adapted to reduce, inhibit, and/or eliminate vibration and noise associated with a timing belt and/or other components of the vehicle engine.

Figure 2A:
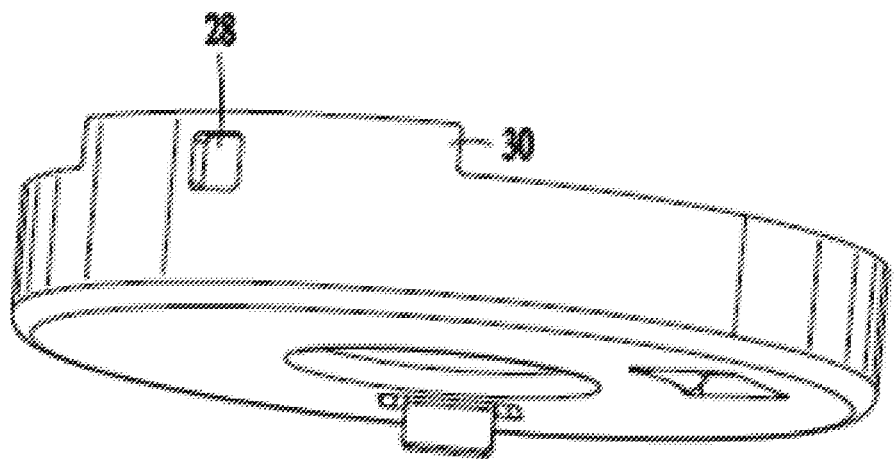
FIG. 2 generally illustrates a fixed bottom plate according to the principles of the present disclosure.
Figure 2B:
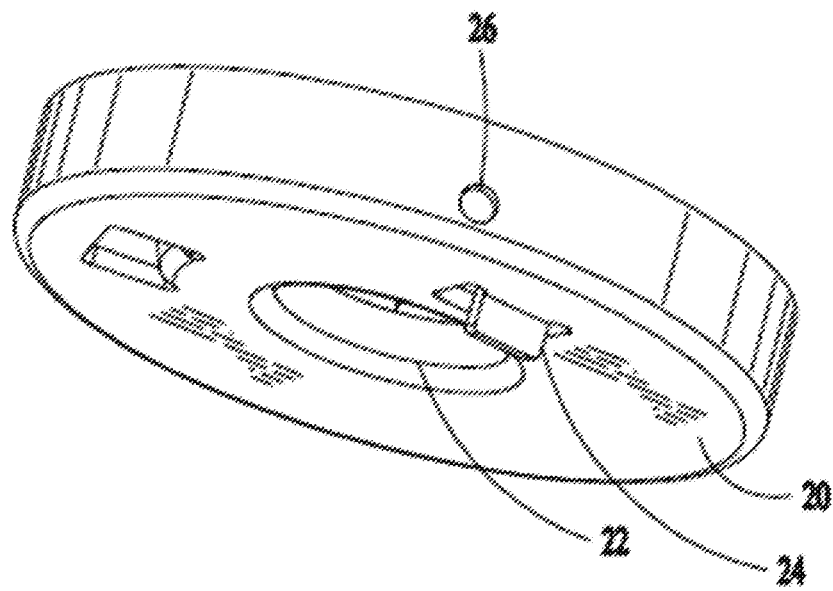

The tensioner 10 includes a fixed bottom plate 20, as is generally illustrated in FIG. 2. The fixed bottom plate 20 includes an upper center hole 22 and stopper 24. The stopper 24 is adapted to cooperate with a portion of the vehicle engine to limit rotation in a circumferential direction of the fixed bottom plate 20 relative to the vehicle engine. In some embodiments, the fixed bottom plate includes a spring seat hole 26, a pin hole 28, and a fixed bottom plate stopper 30.

Figure 3A:
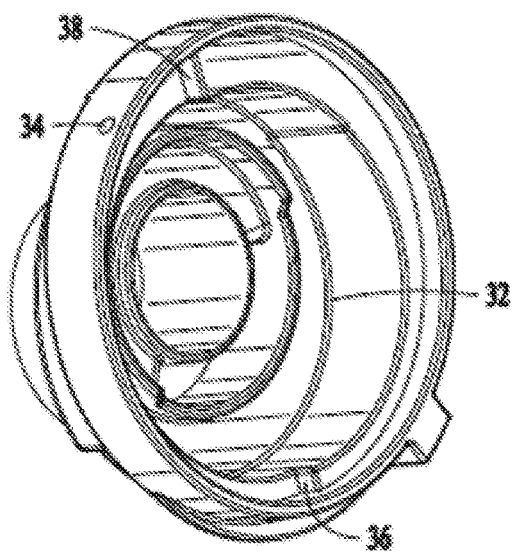
FIG. 3 generally illustrates a tensioner arm according to the principles of the present disclosure.
Figure 3B:
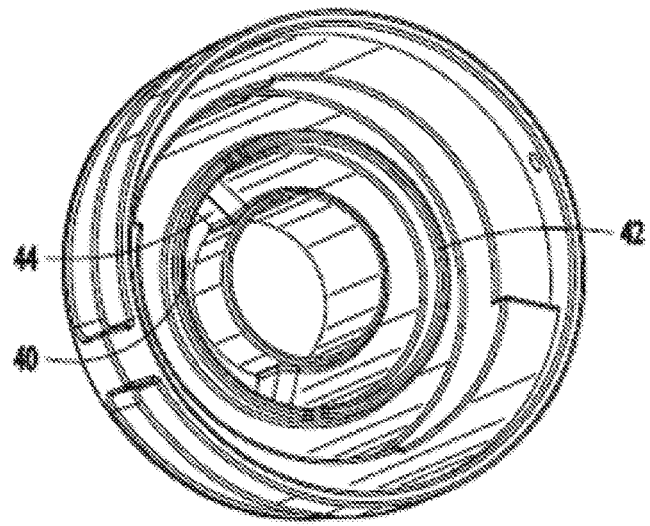
Figure 3C:
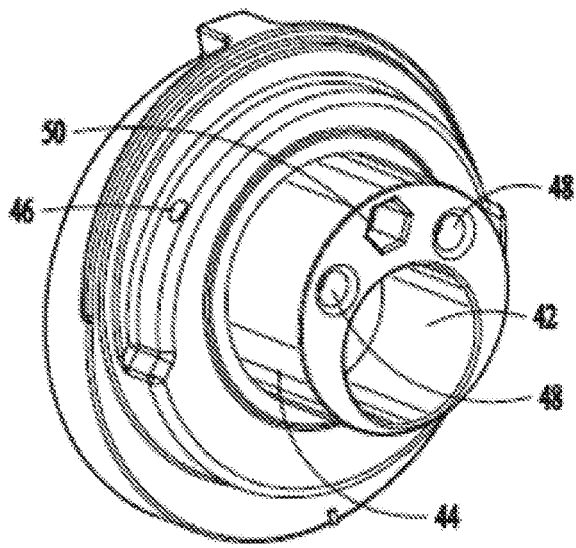

The tensioner 10 includes a tensioner arm 32, as is generally illustrated in FIG. 3. The tensioner arm 32 includes a pin hole 34, a first stopper 36, and a second stopper 38. In some embodiments, the first stopper 36 is disposed on a first end of a recess 40 and the second stopper 38 is disposed on a second end of the recess 40 opposite the first end. The recess 40 includes an arc-shaped profile and is disposed within the tensioner arm 32 around at least a portion of an inner circumferential profile of the tensioner arm 32.

In some embodiments, the tensioner arm 32 includes an inner bore 42. The inner bore 42 is adapted to pass through the tensioner arm 32 and is at least partially defined by generally cylindrical protrusion 44 that extends away from the tensioner arm 32. In some embodiments, the tensioner arm 32 is adapted to rotate about the inner bore 42. The tensioner arm 32 includes a spring seat hole 46 disposed on an exterior portion of the tensioner arm 32. In some embodiments, the tensioner arm 32 includes one or more counter-bores 48 disposed on a top surface of the cylindrical protrusion 44 and a hexagonal aperture 50 disposed substantially proximate the one or more counter-bores 48.

Figure 4A:
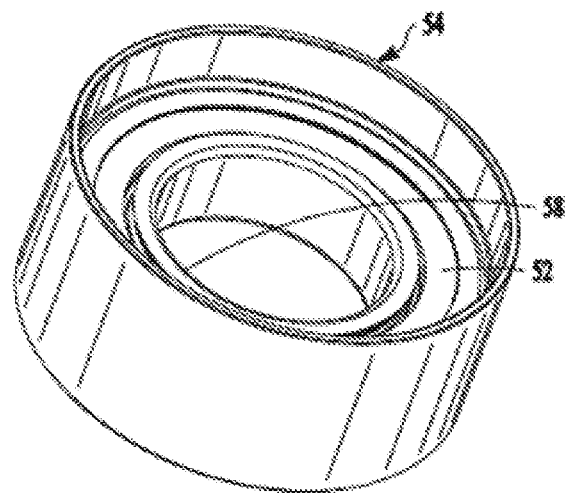
FIGS. 4A-4C generally illustrate a pulley including a ring and bearing according to the principles of the present disclosure.
Figure 4B:
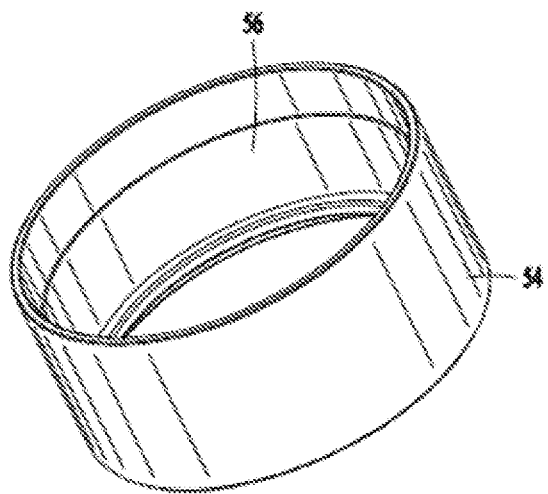
Figure 4C:
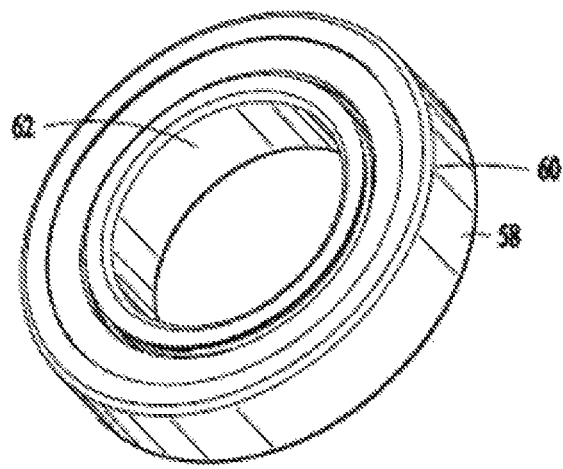

In some embodiments, the tensioner 10 includes a pulley 52, as is generally illustrated in FIGS. 4A-4C. The pulley 52 includes a pulley ring 54. The pulley ring 54 includes an inner bore 56 defined by an inner profile of the pulley ring 54. The pulley 52 includes a bearing 58. The bearing 58 includes an outer portion 60 that extends circumferentially around the bearing 58. The bearing 58 includes an inner bore 62 that extends from a first side of the bearing 58 to a second side of the bearing 58 and is defined by the outer portion 60.

In some embodiments, the inner bore 56 of the pulley ring 54 is adapted to receive the outer portion 60 of the bearing 58. For example, the bearing 58 is press fit into the inner bore 56.

Figure 5:
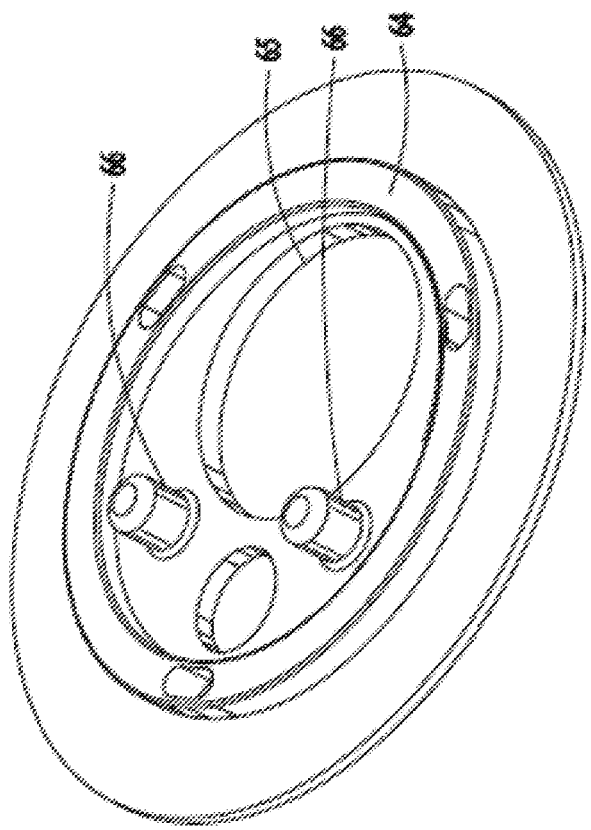
FIG. 5 generally illustrates a friction pad according to the principles of the present disclosure.

In some embodiments, the tensioner 10 includes a friction pad 64, as is generally illustrated in FIG. 5. The friction pad 64 includes one or more bosses 66. The one or more bosses 66 are disposed on a surface of the friction pad 64. The one or more bosses 66 extend away from the surface of the friction pad 64. In some embodiments, the one or more bosses 66 include a generally cylindrical profile. The one or more bosses 66 are adapted to be received by the counter-bores 48 of the tensioner arm 32. The friction pad 64 includes a through bore 65. The through bore 65 passes through the friction pad 64 and is disposed proximate the one or more bosses 66.

Figure 6:
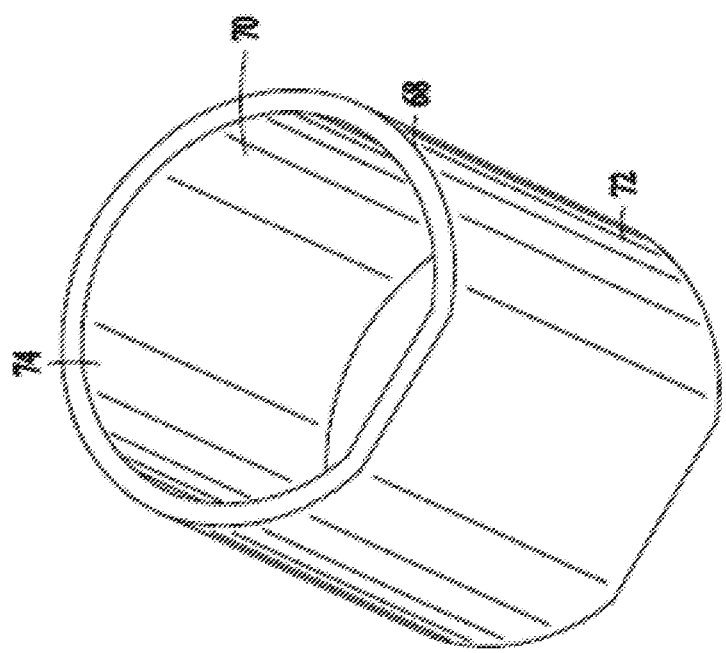
FIG. 6 generally illustrates a self-lubricating bearing according to the principles of the present disclosure.

In some embodiments, the tensioner 10 includes a self-lubricating bearing 68, as is generally illustrated in FIG. 6. The self-lubricating bearing includes a generally cylindrical profile. The self-lubricating bearing 68 can be a conventional self-lubricating bearing or any other suitable self-lubricating bearing. The self-lubricating bearing 68 includes an inner profile 70 and an outer profile 72. The inner profile 70 defines an inner bore 74 that extends from a first side of the self-lubricating bearing 68 to a second side of the self-lubricating bearing 68 opposite the first side. The outer profile 72 defines an outer surface of the self-lubricating bearing 68.

Figure 7:
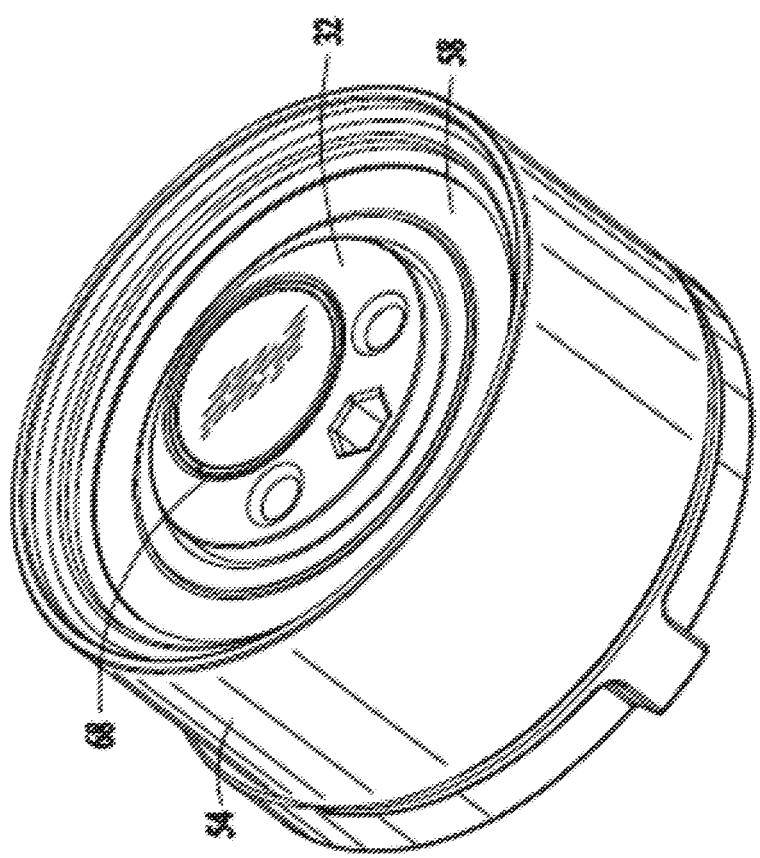
FIG. 7 generally illustrates a tensioner arm and pulley according to the principles of the present disclosure.

In some embodiments, the self-lubricating bearing 68 is adapted to be received by the inner bore 42 of the tensioner arm 32. For example, the outer profile 72 is adapted to correspond to a profile associated with the inner bore 42. The self-lubricating bearing 68 can be press fit into the inner bore 42 as is generally illustrated in FIG. 7.

In some embodiments, the pulley 52, including the pulley ring 54 and the bearing 58 can be adapted to receive the tensioner arm 32. For example, the inner bore 62 of the bearing 58 includes a profile corresponding to a portion of the cylindrical protrusion 44 of the tensioner arm 32. The cylindrical protrusion 44 can be press fit into the inner bore 62.

Figure 8:
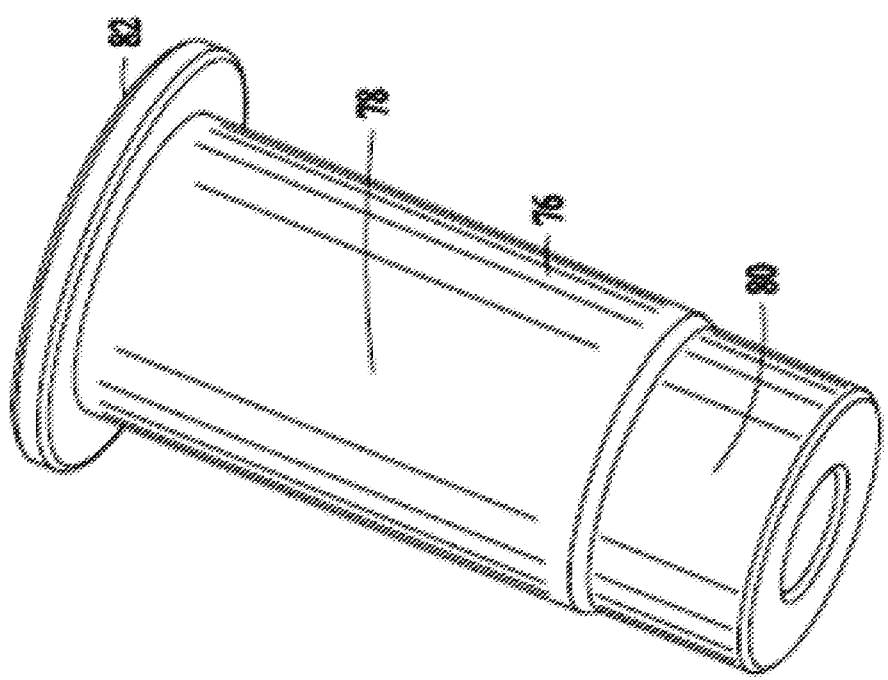
FIG. 8 generally illustrates an axle according to the principles of the present disclosure.

In some embodiments, the tensioner 10 includes an axle 76, as is generally illustrated in FIG. 8. The axle 76 is adapted to be received by the inner bore 74 of the self-lubricating bearing 68. For example, the axle 76 includes a first outer surface 78 and a second outer surface 80. The first outer surface 78 includes a generally cylindrical profile that includes a diameter that is larger than a diameter associated with a generally cylindrical profile of the second outer surface 80.

In some embodiments, the axle 76 can be inserted into the inner bore 74 such that the second outer surface 80 passes through the inner bore 74. The first outer surface 78 is adapted to be press fit into the inner bore 74, such that the first outer surface 78 fits snug within the inner bore 74. In some embodiments, the axle 76 includes a stopper 82. The stopper 82 is disposed on a first end of the axle 76 opposite the second outer surface 80. The stopper 82 includes a profile adapted to prevent the axle 76 from passing through the inner bore 74 beyond the self-lubricating bearing 68. For example, the stopper 82 includes a profile having a diameter that is larger than a diameter associated with the inner bore 74, such that the stopper 82 cannot pass into and/or through the inner bore 74.

Figure 9:
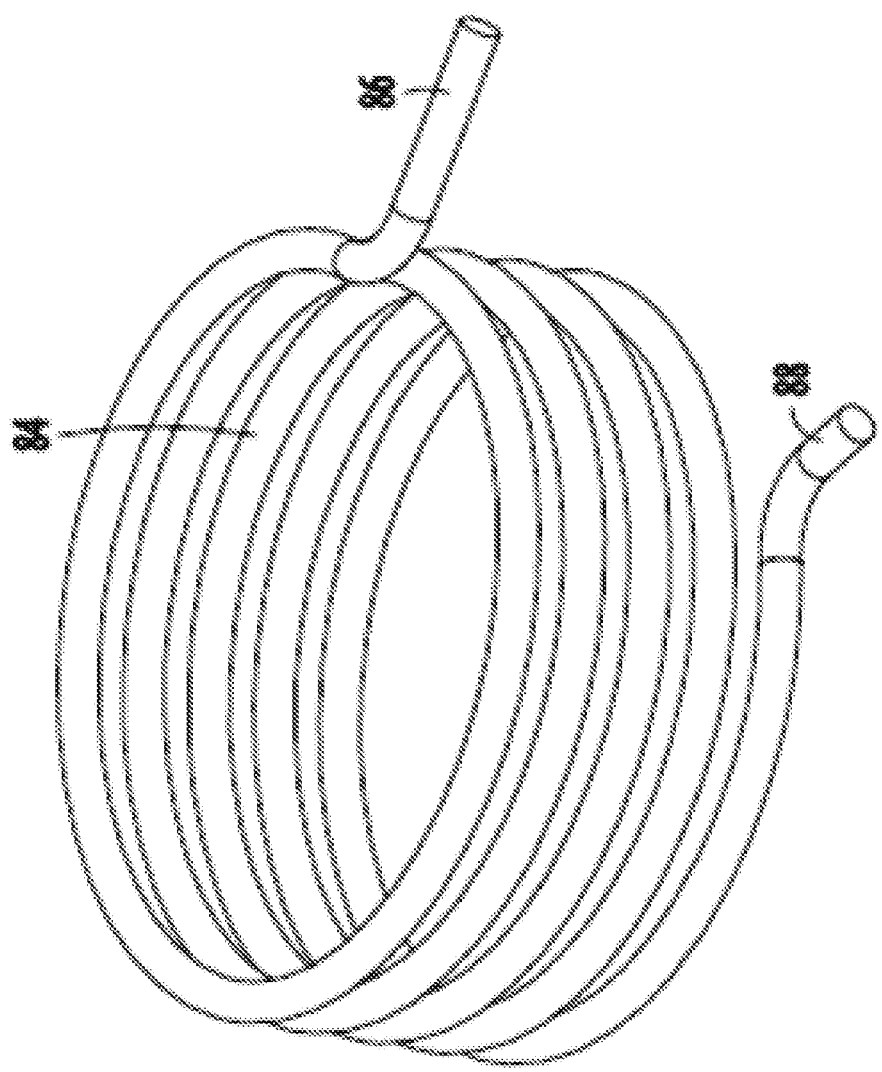
FIG. 9 generally illustrates a spring according to the principles of the present disclosure.

In some embodiments, the tensioner 10 includes a spring 84, as is generally illustrated in FIG. 9. The spring 84 includes a first spring hook 86 disposed at a first end of the spring 84. The spring 84 includes a second spring hook 88 disposed at a second end of the spring 84 opposite the first end of the spring 84. In some embodiments, the second spring hook 88 is adapted to be received by the spring seat hole 26 of the fixed bottom plate 20. In some embodiments, the first spring hook 86 is adapted to be received by the spring seat hole 46 of the tensioner arm 32.

Figure 10:
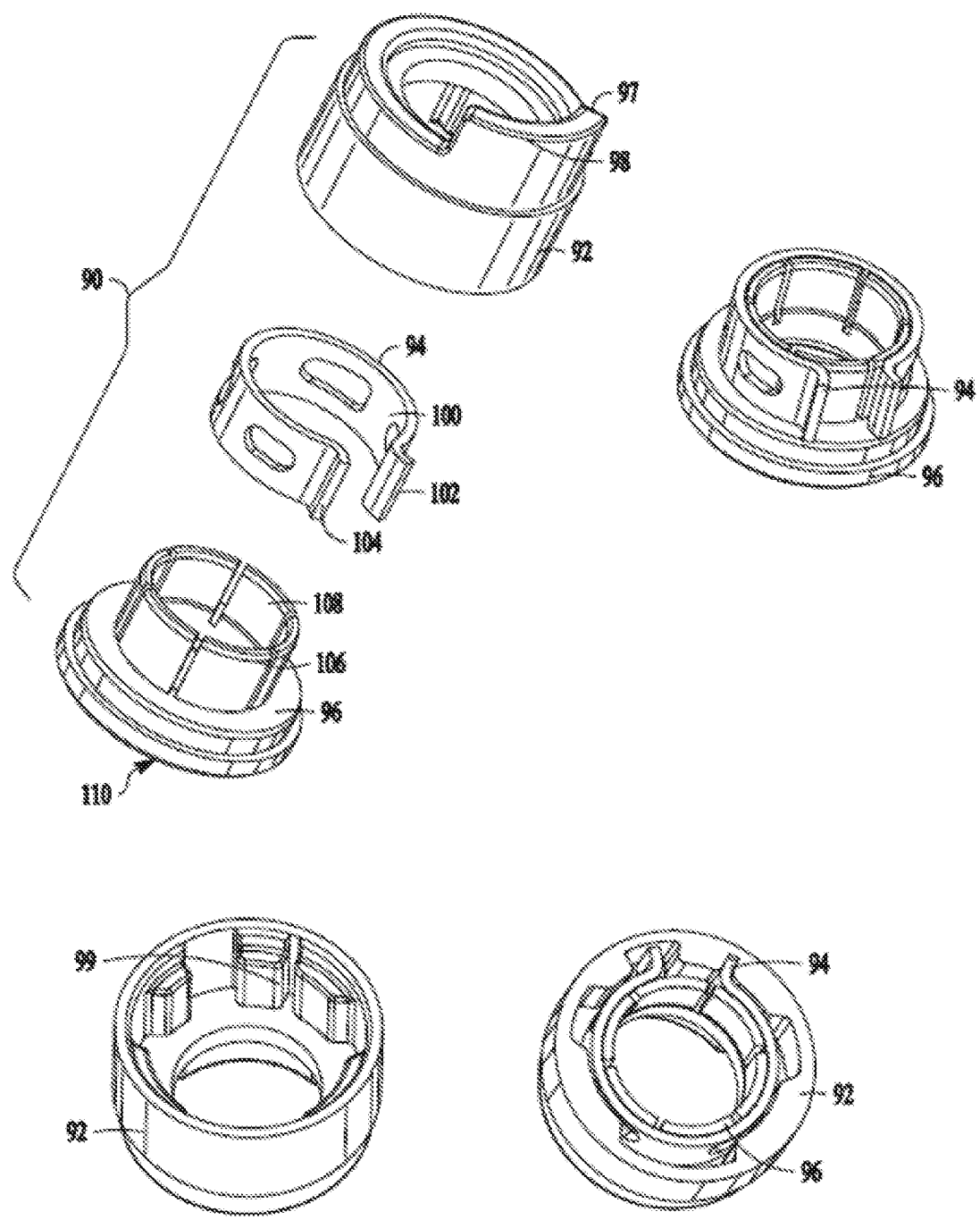
FIG. 10 generally illustrates an exploded view of a damping structure according to the principles of the present disclosure.

In some embodiments, the tensioner 10 includes a damping structure 90, as is generally illustrated in FIG. 10. The damping structure 90 is adapted to reduce, inhibit, and/or eliminate vibration and noise associated with a timing belt and/or other components of the vehicle engine. The damping structure 90 includes a gripping seat 92, a clamp 94, and a damping seat 96. The gripping seat 92 includes a clamp base 98. The clamp base 98 is disposed on a first side of the gripping seat 92 and extends away from the first side of the gripping seat 92. In some embodiments, the clamp base 98 includes an extension 97 disposed on a side of the clamp base 98 opposite the first side of the gripping seat 92. The extension 97 may extend away from the clamp base 98.

In some embodiments, the gripping seat 92 includes a plurality of engaging portions 99. The plurality of engaging portions 99 are disposed on an inner surface of the gripping seat 92. The plurality of engaging portions 99 extend away from the inner surface of the gripping seat 92 toward a center of the gripping seat 92. The plurality of engaging portions 99 may be spaced apart and radially disposed about a circumference of the inner surface of the gripping seat 92.

In some embodiments, the clamp 94 includes an inner surface 100. The clamp 94 includes a first bent portion 102 disposed on a first end of the clamp 94 and a second bent portion 104 disposed on a second end of the clamp 94 opposite the first end of the clamp 94. In some embodiments, the damping seat 96 includes an outer surface 106 and an inner surface 108. In some embodiments, the inner surface 100 of the clamp 94 is adapted to tightly engage the outer surface 106 of the damping seat 96, such that the clamp 94 fits snug around the damping seat 96.

In some embodiments, the damping seat 96 includes a base portion 110. The base portion 110 is disposed on an end of the damping seat 96 and includes a generally circular profile. The generally circular profile is adapted to allow the clamp 94 to rest on the base portion 110 when the clamp 94 engages the damping seat 96. In some embodiments, the damping seat 96 and the clamp 94 are adapted to be received by the gripping seat 92. The first bent portion 102 of the claim 94 is adapted to engage at least one engagement portion 99 and the second bent portion 104 is adapted to engage at least one other engagement portion 99, such that, the clamp 94 fits snug within the gripping seat 92.

Figure 11:
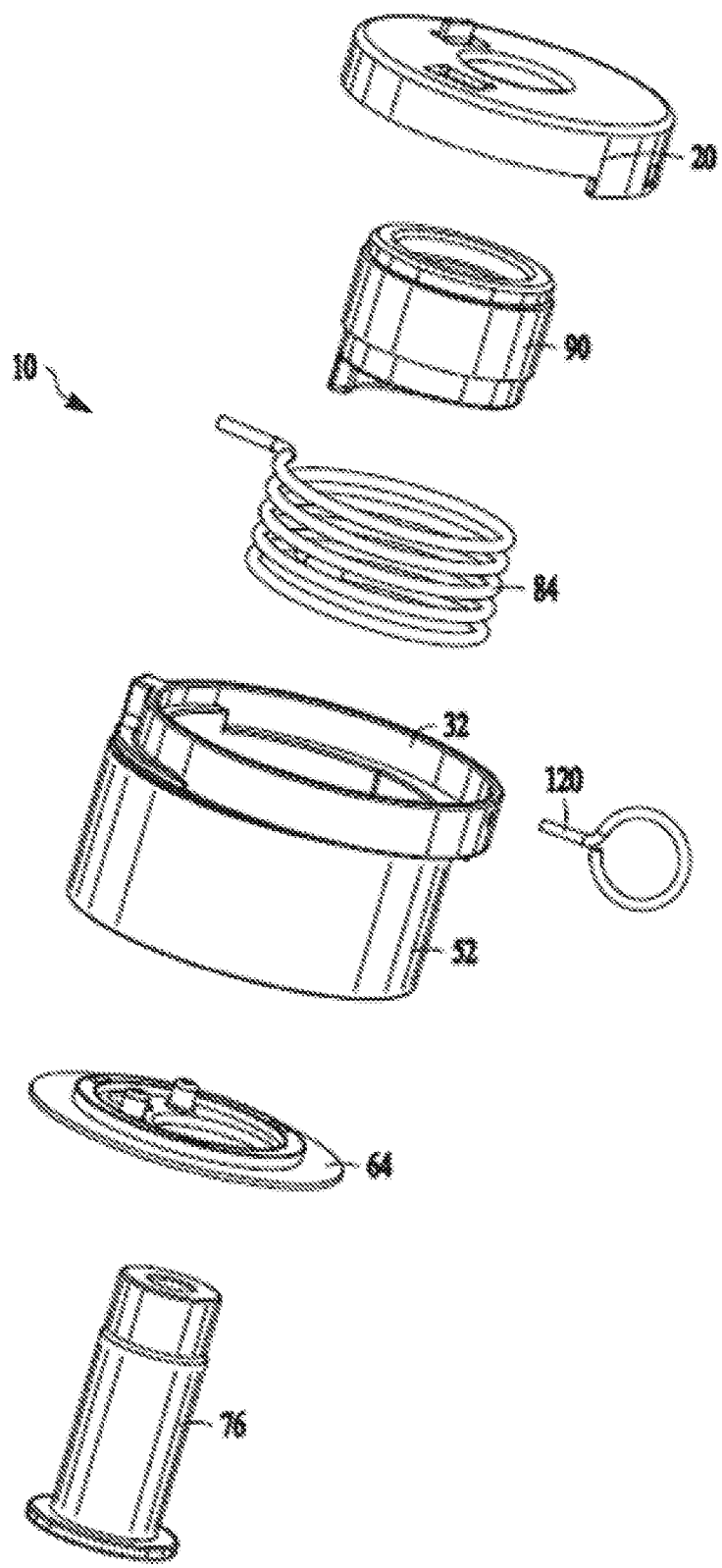
FIG. 11 generally illustrates an exploded view of a friction type one-way high damping gauge tensioner according to the principles of the present disclosure.

FIG. 11 generally illustrates an exploded view of a friction type one-way high damping gauge tensioner 10 including the fixed bottom plate 20, the damping structure 90, the spring 84, the tensioner arm 32, the pulley 52, the friction pad 64, the axle 76, and a pin 120. As described above, the pulley 52 is adapted to receive the tensioner arm 32. In some embodiments, the self-lubricating bearing 68 is received by the inner bore 42 of the tensioner arm 32. the spring 84 is adapted to be received by the tensioner arm 32. The friction pad 64 is adapted to be received by a lower portion of the pulley 52. For example, as described above, the friction pad 64 includes one or more bosses 66. The one or more bosses 66 are adapted to be received by the counter-bores 48 of the tensioner arm 32, such that the friction pad 64 fits snug against the tensioner arm 32.

In some embodiments, as described above, the axle 76 is adapted to be received by the inner bore 42 of the tensioner arm 32. The axle 76 includes the first outer surface 78 and the second outer surface 80. The axle 76 may be inserted through the through bore 65 of the friction pad 64. The axle 76 may pass through the through bore 65 into the inner bore 42 of the tensioner arm 32. As described above, the first outer surface 78 is adapted to be press fit into the inner bore 42, such that the first outer surface 78 fits snug within the inner bore 42. The second outer surface 80 is adapted to pass through the inner bore 42. The stopper 82 of the axle 76 is adapted to make contact with a portion of the friction pad 64 and prevent the axle 76 from passing beyond the friction pad 64.

In some embodiments, the second outer surface 80 of the axle 76 is adapted to be received by the inner surface 108 of the damping seat 96 which is disposed within the gripping seat 92, as described above. The second outer surface 80 is adapted to fit within the inner surface 108 of the damping seat 96. The tensioner arm 32 is adapted to rotate about the axle 76. For example, the first outer surface 78 of the axle 76 is intermeshed with the inner profile 70 of the self-lubricating bearing 68 when the axle 76 is received by the tensioner arm 32. The self-lubricating bearing 68 is adapted to allow the tensioner arm 32 to rotate about the axle 76.

In some embodiments, the damping structure 90 is adapted to be received by the tensioner arm 32. For example, the clamp base 98 includes an extension 97. The extension 97 is adapted to be received by the recess 40 of the tensioner arm 32. For example, the extension 97 includes a profile corresponding to a profile of the recess 40. The extension 97 is adapted to be press fit into the recess 40. In some embodiments, the fixed bottom plate 20 is adapted to receive the damping structure 90. For example, the damping structure 90 is adapted to be received by the upper center hole 22 of the fixed bottom plate 20.

In some embodiments, the fixed bottom plate 20 is adapted to be secured to the tensioner arm 32. For example, the pin hole 28 of the fixed bottom plate 20 is adapted to align with the pin hole 34 of the tensioner arm 32 when the fixed bottom plate 20 is received by the tensioner arm 32. In some embodiments, the tensioner 10 includes a pin 120. The pin 120 is adapted to be inserted into the pin hole 34. The pin 120 is adapted to pass through the pin hole 34 into the pin hole 28. The pin 120 is adapted to secure the fixed bottom plate 20 to the tensioner arm 32. For example, the pin 120 may include a plurality of threads disposed on an end of the pin 120 that is inserted into the pin hole 34. The pin hole 34 and/or the pin hole 28 may be adapted to receive the plurality of threads, such that, the pin 120 is secured to the pin hole 34 and/or the pin hole 28.

In some embodiments, the friction pad 64 is adapted to generate a relatively large friction force when the tensioner arm 32 rotates about the axle 76 in a first direction. In some embodiments, the damping structure 90 is adapted to generate a relatively small friction force when the tensioner arm 32 rotates about the axle 76 in a second direction opposite the first direction. Additionally, or alternatively, the damping structure 90 is adapted to limit rotation of the tensioner arm 32 in the second direction. The damping structure 90 may provide friction breaking to the tensioner arm 32 when the damping structure 90 limits rotation of the tensioner arm 32 in the second direction.

In some embodiments, the spring 84 is adapted to provide an initial torque on the tensioner arm 32. For example, the spring 84 may be adapted to bias the tensioner arm 32 in a starting and/or initial position. The spring 84 may apply a force to the tensioner arm 32 in order to bias the tensioner arm 32 in the starting and/or initial position. The force applied by the spring 84 on the tensioner arm 32 may encourage the tensioner arm 32 to return to the starting and/or initial position when the tensioner arm 32 rotates about the axle 76.

In some embodiments, a timing belt may engage the tensioner 10 at a first end of the timing belt and one or more timing components of a vehicle engine at a second end of the timing belt. The one or more timing components may rotate in response to rotation of the vehicle engine. The one or more timing components may rotate the timing belt. The timing belt may cause the tensioner arm 32 to rotate about the axle 76. The damping structure 90 may limit rotation of the tensioner arm 32 in the direction of the rotation of the timing belt (e.g., the second direction) and provide vibration and noise reduction. Additionally, or alternatively, the spring 84 may bias the tensioner arm 32 back to the starting and/or initial position which may control movement of the tensioner arm 32, such that, vibration and noise generated from the tensioner 10, the timing belt, and/or the vehicle engine are reduced.

In some embodiments, the fixed bottom plate 20 may be fixed and/or secured to an engine housing associated with the vehicle engine. The tensioner arm 32 may be adjusted in a clockwise direction by engaging the hexagonal aperture 50 of the tensioner arm 32 with a wrench or another suitable device. For example, the wrench includes a hexagonal wrench adapted to be received by the hexagonal aperture 50. When the tensioner arm 32 is adjusted in the clockwise direction, the torque acting on the tensioner arm 32 is increased by the action of the spring 84. When a desired timing angle is reached, the tensioner arm 32 engages the clamp base 98. When the tensioner arm 32 engages the clamp base 98, the clamp 94 will produce a positive pressure on the damping seat 96. The damping seat 96 and the axle 76 cooperate to generate a larger positive pressure within the tensioner 10. When the tensioner arm 32 is rotated about the axle 76, a relatively large friction force is generated, which may result in a relatively large damping. The damping generated by the rotation may suppress and/or limit swing of the timing belt with respect to the tensioner 10.

Additionally, or alternatively, the spring 84 can act on the tensioner arm 32 causing the tensioner arm 32 to rotate in a counterclockwise direction. When the tensioner arm 32 is rotated in the counterclockwise direction, the torque acting on the tensioner arm 32 is reduced. When the tensioner arm 32 reaches a first position, the tensioner arm contacts with the clamp base 98. The clamp 94 rotates counterclockwise in response to the tensioner arm 32 rotating counterclockwise. A tightening force between the clamp 94 and the and gripping seat 92 decreases which decreases a friction between the claim 94 and the gripping seat 92. The tensioner arm 32 under the action of the spring 84 can quickly tension the timing belt against a component of the vehicle engine.

In some embodiments, the tensioner 10 can be installed on the vehicle engine, as described above. When the vehicle engine is started, a relatively high torsional vibration can be generated by the vehicle engine. This can be due to, for example, initial combustion of fuel in an engine cylinder. The tensioner 10 can quickly tighten the timing belt, in order to reduce jitter and/or undesirable movement of the timing belt. Additionally, or alternatively, the damping structure 90 can be rotated by the tensioner arm 32 to a first position. For example, the tensioner arm 32 can slowly drive the gripping seat 92. This can generate friction and can result in high damping. The high damping can suppress additional jitter of the timing belt. As the engine continues to operate, the tensioner 10 can provide a high damping in order to control jitter of the timing belt.

The tensioner arm may include a self-lubricating bearing disposed in the inner bore. The tensioner may include a friction pad that includes at least one boss having a profile corresponding to a profile of the at least one counter-bore. The spring may include a first end and a second end. The first end may be received by a first spring seat hole disposed on an inner surface of the tensioner arm and the second end may be received by a second spring seat hole disposed on the inner surface of the tensioner arm remotely from the first spring seat hole. The tensioner may include pulley that includes a pulley ring and a bearing. The pulley ring is adapted to receive the bearing and the bearing includes a through bore that is adapted to receive a portion of the tensioner arm. The tensioner may include a fixed bottom plate that includes a first pin hole disposed on an outer surface of the fixed bottom plate and the tensioner arm includes a second pin hole disposed on an outer surface of the tensioner arm.

The tensioner may include a pin adapted to be received by first pin hole and the second pin hole when the first pin hole is aligned with the second pin hole. The damping structure may include a clamp that includes a first bent portion and a second bent portion, the first bent portion being adapted to engage at least one engaging portion of the gripping seat and the second bent portion being adapted to engage at least one other engaging portion of the gripping seat.

In some embodiments, an engine timing tensioner for reducing vibration and noise associated with a vehicle engine may include: a tensioner arm having a cylindrical protrusion extending from a first side of the tensioner arm; the cylindrical protrusion having at least one counter-bore disposed on a surface of the cylindrical protrusion and an inner bore extending through the cylindrical protrusion; an axle adapted to be received by the inner bore, the tensioner arm being adapted to rotate about the axle; a spring disposed proximate a second side of the tensioner arm, opposite the first side, the spring being adapted to bias the tensioner arm in a first direction; and a damping structure that includes a gripping seat adapted to engage a portion of the tensioner arm, wherein the damping structure limits rotation of the tensioner arm in a second direction opposite the first direction.

In some embodiments, a tensioner that may include: a tensioner arm having a protrusion extending from away from the tensioner arm; the protrusion having an inner bore extending through the protrusion; an axle adapted to be received by the inner bore, the tensioner arm being adapted to rotate about the axle; a spring disposed on an inner portion of the tensioner arm, the spring being adapted to bias the tensioner arm in a first direction; and a damping structure that includes a gripping seat adapted to engage a portion of the tensioner arm, wherein the damping structure limits rotation of the tensioner arm in a second direction opposite the first direction.

In some embodiments, a system that may include: a tensioner arm having a cylindrical protrusion extending from a first side of the tensioner arm; the cylindrical protrusion having at least one counter-bore disposed on a surface of the cylindrical protrusion and an inner bore extending through the cylindrical protrusion; an axle adapted to be received by the inner bore, the tensioner arm being adapted to rotate about the axle; a spring disposed proximate a second side of the tensioner arm, opposite the first side, the spring being adapted to bias the tensioner arm in a first direction; a friction pad that includes at least one boss having a profile corresponding to a profile of a at least one counter-bore; a fixed bottom plate that includes a first pin hole disposed on an outer surface of the fixed bottom plate; a damping structure that includes a gripping seat adapted to engage a portion of the tensioner arm, wherein the damping structure limits rotation of the tensioner arm in a second direction opposite the first direction; and a pin adapted to be received by first pin hole and a second pin hole disposed on an outer surface of the tensioner arm when the first pin hole is aligned with the second pin hole.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosure has been described in connection with certain embodiments or implementations, it is to be understood that the disclosure is not to be limited to the disclosed embodiments or implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A tensioner for reducing vibration and noise associated with a vehicle engine, comprising:
   a tensioner arm having a cylindrical protrusion extending from a first side of the tensioner arm, the cylindrical protrusion having at least one counter-bore disposed on a surface of the cylindrical protrusion and an inner bore extending through the cylindrical protrusion;
   an axle adapted to be received by the inner bore, the tensioner arm being adapted to rotate about the axle;
   a spring disposed proximate a second side of the tensioner arm, opposite the first side, the spring being adapted to bias the tensioner arm in a first direction; and
   a damping structure comprising:
      a gripping seat including multiple engaging portions disposed on an inner surface of the gripping seat;
      a clamp including a first bent portion disposed on a first end of the clamp and adapted to engage at least one of the engaging portions with a first amount of play and a second bent portion disposed on a second end of the clamp opposite of the first end of the clamp, the second bent portion adapted to engage at least one other of the engaging portions with a second amount of play greater than the first amount of play; and
      a damping seat, wherein an inner surface of the clamp fits snuggly around an outer surface of the damping seat and an outer surface of the clamp snuggly fits within the gripping seat;
   wherein the gripping seat is adapted to engage a portion of the tensioner arm, and the damping structure limits rotation of the tensioner arm in a second direction opposite the first direction.

2. The tensioner of claim 1, wherein the tensioner arm includes a self-lubricating bearing disposed in the inner bore.

3. The tensioner of claim 1, further comprising a friction pad that includes at least one boss having a profile corresponding to a profile of the at least one counter-bore.

4. The tensioner of claim 1, wherein the spring includes a first end and a second end and wherein the first end is received by a first spring seat hole disposed on an inner surface of the tensioner arm and the second end is received by a second spring seat hole disposed on the inner surface of the tensioner arm remotely from the first spring seat hole.

5. The tensioner of claim 1, further comprising a pulley that includes a pulley ring and a bearing.

6. The tensioner of claim 5, wherein the pulley ring is adapted to receive the bearing and wherein the bearing includes a through bore that is adapted to receive a portion of the tensioner arm.

7. The tensioner of claim 1, further comprising a fixed bottom plate that includes a first pin hole disposed on an outer surface of the fixed bottom plate and wherein the tensioner arm includes a second pin hole disposed on an outer surface of the tensioner arm.

8. The tensioner of claim 7, further comprising a pin adapted to be received by first pin hole and the second pin hole when the first pin hole is aligned with the second pin hole.

9. A tensioner comprising:
   a tensioner arm having a protrusion extending from the tensioner arm, the protrusion having an inner bore extending through the protrusion;
   an axle adapted to be received by the inner bore, the tensioner arm being adapted to rotate about the axle;
   a spring disposed on an inner portion of the tensioner arm, the spring being adapted to bias the tensioner arm in a first direction; and
   a damping structure comprising:
      a gripping seat including multiple engaging portions disposed on an inner surface of the gripping seat;

a clamp including a first bent portion disposed on a first end of the clamp and adapted to engage at least one of the engaging portions with a first amount of play and a second bent portion disposed on a second end of the clamp opposite of the first end of the clamp, the second bent portion adapted to engage at least one other of the engaging portions with a second amount of play greater than the first amount of play; and a damping seat, wherein an inner surface of the clamp fits snuggly around an outer surface of the damping seat and an outer surface of the clamp snuggly fits within the gripping seat;

wherein the gripping seat is adapted to engage a portion of the tensioner arm, and the damping structure limits rotation of the tensioner arm in a second direction opposite the first direction.

10. The tensioner of claim 9, wherein the tensioner arm includes a self-lubricating bearing disposed in the inner bore.

11. The tensioner of claim 9, further comprising a friction pad that includes at least one boss having a profile corresponding to a profile of at least one counter-bore disposed on the protrusion, wherein the at least one boss is received by the at least one counter-bore.

12. The tensioner of claim 9, wherein the spring includes a first end and a second end and wherein the first end is received by a first spring seat hole disposed on the inner portion of the tensioner arm and the second end is received by a second spring seat hole disposed on the inner portion of the tensioner arm remotely from the first spring seat hole.

13. The tensioner of claim 9, further comprising a pulley that includes a pulley ring and a bearing.

14. The tensioner of claim 13, wherein the pulley ring is adapted to receive the bearing and wherein the bearing includes a through bore that is adapted to receive a portion of the tensioner arm.

15. The tensioner of claim 9, further comprising a fixed bottom plate that includes a first pin hole disposed on an outer surface of the fixed bottom plate and wherein the tensioner arm includes a second pin hole disposed on an outer surface of the tensioner arm.

16. The tensioner of claim 15, further comprising a pin adapted to be received by first pin hole and the second pin hole when the first pin hole is aligned with the second pin hole.

17. A system, comprising:
a tensioner arm having a cylindrical protrusion extending from a first side of the tensioner arm, the cylindrical protrusion having at least one counter-bore disposed on a surface of the cylindrical protrusion and an inner bore extending through the cylindrical protrusion;
an axle adapted to be received by the inner bore, the tensioner arm being adapted to rotate about the axle;
a spring disposed proximate a second side of the tensioner arm, opposite the first side, the spring being adapted to bias the tensioner arm in a first direction;
a friction pad that includes at least one boss having a profile corresponding to a profile of at least one counter-bore;
a fixed bottom plate that includes a first pin hole disposed on an outer surface of the fixed bottom plate;
a damping structure comprising:
a gripping seat including multiple engaging portions disposed on an inner surface of the gripping seat;
a clamp including a first bent portion disposed on a first end of the clamp and adapted to engage at least one of the engaging portions with a first amount of play and a second bent portion disposed on a second end of the clamp opposite of the first end of the clamp, the second bent portion adapted to engage at least one other of the engaging portions with a second amount of play greater than the first amount of play; and
a damping seat, wherein an inner surface of the clamp fits snuggly around an outer surface of the damping seat and an outer surface of the clamp snuggly fits within the gripping seat;
wherein the gripping seat is adapted to engage a portion of the tensioner arm, and the damping structure limits rotation of the tensioner arm in a second direction opposite the first direction; and
a pin adapted to be received by first pin hole and a second pin hole disposed on an outer surface of the tensioner arm when the first pin hole is aligned with the second pin hole.

\* \* \* \* \*